(12) United States Patent
Subramanyam et al.

(10) Patent No.: US 7,817,734 B2
(45) Date of Patent: Oct. 19, 2010

(54) SYSTEM AND METHOD FOR IMPROVING SIGNAL TO QUANTIZATION NOISE RATIO OF AN OFDMA MODULATOR

(75) Inventors: Kommanaboyina Subramanyam, Andhra Pradesh (IN); Bror W. Peterson, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 1037 days.

(21) Appl. No.: 11/582,832

(22) Filed: Oct. 17, 2006

(65) Prior Publication Data

US 2007/0086534 A1 Apr. 19, 2007

Related U.S. Application Data

(60) Provisional application No. 60/727,978, filed on Oct. 18, 2005.

(51) Int. Cl.
*H04K 1/00* (2006.01)
(52) U.S. Cl. .................. 375/260; 375/261; 375/147; 375/343; 375/140; 370/208; 370/203; 370/206; 455/446; 455/449; 455/422.1
(58) Field of Classification Search .......... 375/260, 375/261, 147, 343, 140; 370/203, 206, 208; 455/446, 449, 422.1
See application file for complete search history.

(56) References Cited

U.S. PATENT DOCUMENTS

| | | | | |
|---|---|---|---|---|
| 6,247,034 | B1 | 6/2001 | Nakai et al. | 708/409 |
| 6,411,978 | B1 * | 6/2002 | Naveh et al. | 708/404 |
| 2002/0044597 | A1 | 4/2002 | Shively et al. | 375/222 |
| 2005/0111525 | A1 | 5/2005 | Driesen et al. | 375/147 |
| 2006/0018250 | A1 * | 1/2006 | Gu et al. | 370/208 |
| 2006/0120266 | A1 * | 6/2006 | Song et al. | 370/203 |
| 2007/0047431 | A1 * | 3/2007 | Nishio et al. | 370/203 |

OTHER PUBLICATIONS

Ahmad R. S. Bahai et al., "Multi-carrier Digital Communications: Theory and Applications of OFDM", Second Edition, Springer, Oct. 2004.
Ronald N. Bracewell "The Fourier Transform & Its Applications" Third Edition, Mc Graw-Hill Science, Jun. 1999.

* cited by examiner

*Primary Examiner*—Eva Y Puente

(57) ABSTRACT

A fixed-point IFFT device in an OFDMA digital modulator is disclosed, which comprises a sub-carrier activity detector configured to detect a number of active sub-carriers in an OFDMA symbol set being transmitted in a given OFDMA symbol period, a scale termination calculator configured to generate an output for determining at which stage to terminate the IFFT scaling as a predetermined function of the number of active sub-carriers, a scaling controller configured to generate a plurality of control signals based on the output of the scale termination calculator, and an IFFT unit having a plurality of scaling stages each of which is controlled by one of the generated control signals.

16 Claims, 4 Drawing Sheets

SYSTEM AND METHOD FOR IMPROVING SIGNAL TO QUANTIZATION NOISE RATIO OF AN OFDMA MODULATOR

This application claims the benefits of U.S. patent application Ser. No. 60/727,978, which was filed on Oct. 18, 2005 and entitled "Method for Improving Signal to Quantization Noise Ratio of an OFDMA Modulator."

BACKGROUND

The present invention relates generally to communication systems, and more particularly to system and method for improving the signal-to-quantization noise ratio of an orthogonal frequency division multiple access digital modulator.

In recent years, communications designs increasingly rely on the orthogonal frequency division multiple access (OFDMA) mode for wireless communications due to its superior performance in multi-path fading wireless channels. In a multi-carrier transmission environment, the data stream is split into multiple parallel data streams of reduced rate, each of them transmitted on a separate frequency or sub-carrier, and each sub-carrier must be spaced away from another such that its signal does not interfere with the signal of another. The OFDMA is a special case of multi-carrier transmission that permits sub-channels to overlap in frequency without mutual interference. Because sub-channels can now overlap without interference, an increased spectral efficiency is achieved. In other words, OFDMA exploits signal processing technology to obtain the most cost-effective means of implementation, wherein multiple users can be supported by allocating each user a group of sub-carriers, without fearing that sub-carriers themselves would interfere with each other. The theories of OFDMA mode are well known and are well explained in "Multi-carrier Digital Communications: Theory and Applications of OFDM" by Ahmad R. S. Bahai et al. $2^{nd}$ Ed., Springer, October 2004. OFDMA technology has been recommended and successfully implemented in other wireless standards such as digital video broadcasting (DVB) and wireless local area networking (WLAN).

As wireless technology such as the OFDMA mode continues to advance, the minimization of cost and power consumption for communication devices is much needed. In order to minimize the size and power consumption of the chips within a communication system, an efficient implementation of algorithms in the hardware architecture is required. Thus, it is of paramount importance to minimize the word-length of the data as long as the desired precision constraints are respected. One of the most commonly used criteria for evaluating whether the desired precision constraints are met is the signal-to-quantization noise ratio (SQNR). In a typical wireless system, a first stage to perform such an evaluation is the estimation of the dynamic range of the data in order to determine the word-length of their integer part. Then, the word-lengths of the data are optimized according to one or more desired SQNR constraints. The achievement of a second stage is based on the availability of a tool allowing the evaluation of quality of the implementation through the determination of the SQNR at the output of the system.

However, conventional OFDMA digital modulators use fixed-point inverse fast Fourier transform (IFFT) devices, which do not properly allow the detection of the number of active sub-carriers and scale. As a result, the traditional fixed-point IFFT device is required to have a higher dynamic range, thus requiring a more complex fixed-point arithmetic system and/or additional dynamic scaling circuitries. These additional complexity yields an undesired level of SQNR. The mechanics of these conventional IFFT devices are well known and are explained in detail in "The Fourier Transform & Its Applications" by Ronald N. Bracewell. $3^{rd}$ Ed., McGraw-Hill Science, June 1999.

Therefore, it is desirable to devise a system and method for implementing a fixed-point IFFT design that has the ability to detect active sub-carriers and scale accordingly in order to improve the SQNR of an OFDMA modulator.

SUMMARY

In view of the foregoing, a fixed-point IFFT device in an OFDMA digital modulator is disclosed, which comprises a sub-carrier activity detector configured to detect a number of active sub-carriers in an OFDMA symbol set being transmitted in a given OFDMA symbol period, a scale termination calculator configured to generate an output for determining at which stage to terminate the IFFT scaling as a predetermined function of the number of active sub-carriers, a scaling controller configured to generate a plurality of control signals based on the output of the scale termination calculator, and an IFFT unit having a plurality of scaling stages each of which is controlled by one of the generated control signals.

In another aspect of the present invention, the method comprises detecting a first number of active sub-carriers in an OFDMA symbol set received by the OFDMA digital modulator, determining a second number of scale termination based on the first number, and controlling the scaling of each stage in the fixed-point IFFT device based on the second number.

The construction and method of operation of the invention, however, together with additional objects and advantages thereof will be best understood from the following description of specific embodiments when read in connection with the accompanying drawings.

DESCRIPTION

The following will provide a detailed description of a method for implementing a fixed-point IFFT device for detecting active sub-carriers and scale in an OFDMA modulator.

Figure 1A:
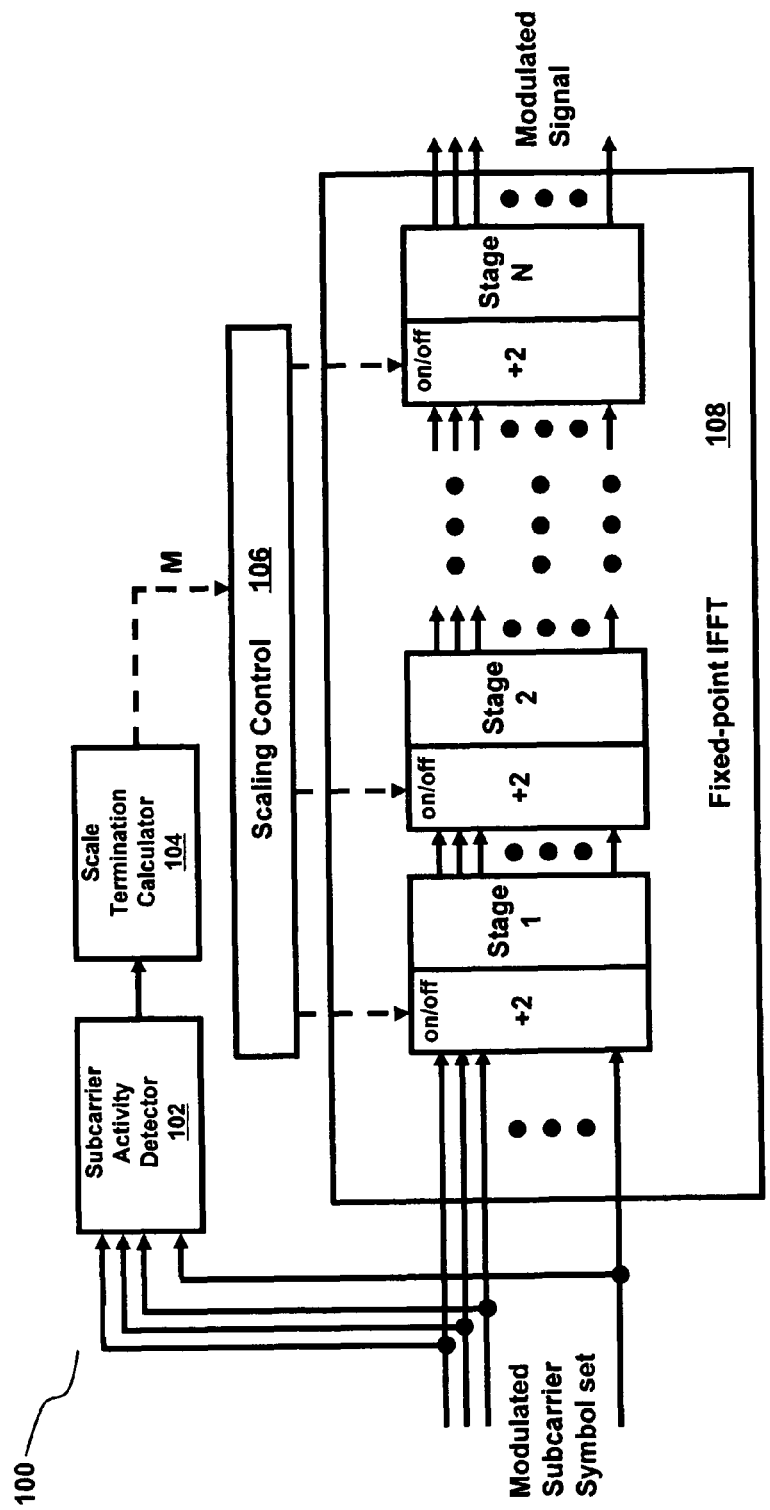
FIG. 1A illustrates a fixed-point IFFT device in accordance with one embodiment of the present invention.

FIG. 1A illustrates a fixed-point IFFT device 100 comprising at least a sub-carrier activity detector 102, a scale termination calculator 104, a scaling control module 106, and an IFFT device 108. The combination of the sub-carrier activity detector 102, the scale termination calculator 104, and the scaling control module 106 terminates scaling following any stage of the IFFT process, thereby improving the SQNR of the OFDMA digital modulator.

The sub-carrier activity detector 102 takes in an allocated sub-carrier symbol set, which is typically generated by a sub-carrier allocation module. The sub-carrier activity detector 102 then determines the number of active sub-carrier according to a set of predetermined algorithms for each set of sub-carrier being transmitted in a given OFDMA symbol period. The scale termination calculator 104 uses the number of active sub-carriers provided by the sub-carrier activity detector 102 as a factor to determine at which stage to terminate the IFFT scaling. In other words, the stage to terminate the IFFT scaling is a function of the number of active sub-carriers, hereinafter to be synonymous with "count". A number of termination functions can be designed for use in this example based on the follow relationship:

$$M = \log 2(\text{length}(\text{input})) - \text{ceil}(\log 2(\text{count}))$$

where the function ceil is used for returning the smallest integral value not less than the function's argument, which is the logarithmic difference between the length of the input (wireless signal) and the count, and M represents the number of termination stages. The number of termination stages, M, is fed to the scaling control unit 106, which generates the appropriate on/off signals to enable or bypass scaling at the appropriate stages of the IFFT device 108. At each stage of the IFFT device 108, a preset fixed scaling value is provided for scaling the signal accordingly. As shown in FIG. 1, the fixed scaling value is "+2" for stages 1 to N. However, it is understood by those skilled in the art that any scaling schedule can be used.

By implementing the fixed-point IFFT device 100 which can control its own scaling schedule by detecting and exploiting the number of sub-carriers that are active in a given symbol period to an OFDMA modulator, the SQNR performance can be increased significantly.

Figure 1B:
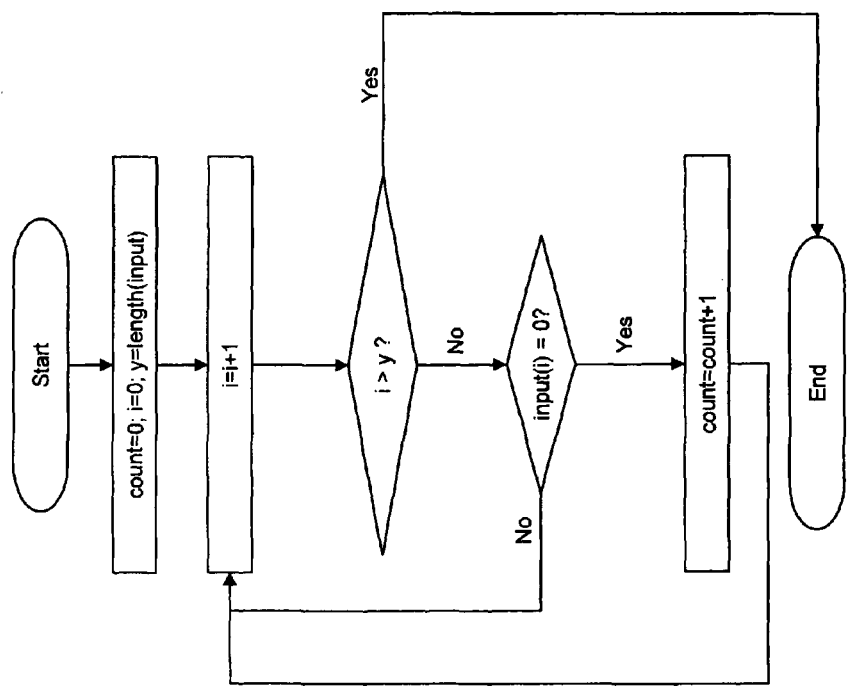
FIG. 1B presents a flowchart for determining the number of active sub-carriers in accordance with one embodiment of the present invention.

In accordance with the invention, the algorithm implemented by the sub-carrier activity detector 102 must allow for the determination of the number of active sub-carriers within the allocated sub-carrier symbol set. FIG. 1B presents a flowchart 150 giving one example of such an algorithm. The algorithm starts by finding y, which is the length of an input, which is the allocated sub-carrier symbol set. For each increment of a variable i, the variable i is compared against y. If the variable i is larger than y, the algorithm ends, meaning that the algorithm has reached the end of the symbol set. If the variable i is not larger than y, the algorithm proceeds by finding the value of the input at the position i, to be given by input(i). If the value of the input at the position i is zero, an active sub-carrier is found, and a counter "count" is incremented. If the value of the input at the position i is not zero, the algorithm proceeds to continue to increment the variable i until the variable i is larger than y. At the end, the result of the algorithm is the value of the counter "count", which is the number of active sub-carriers within the allocated sub-carrier symbol set.

Figure 2:
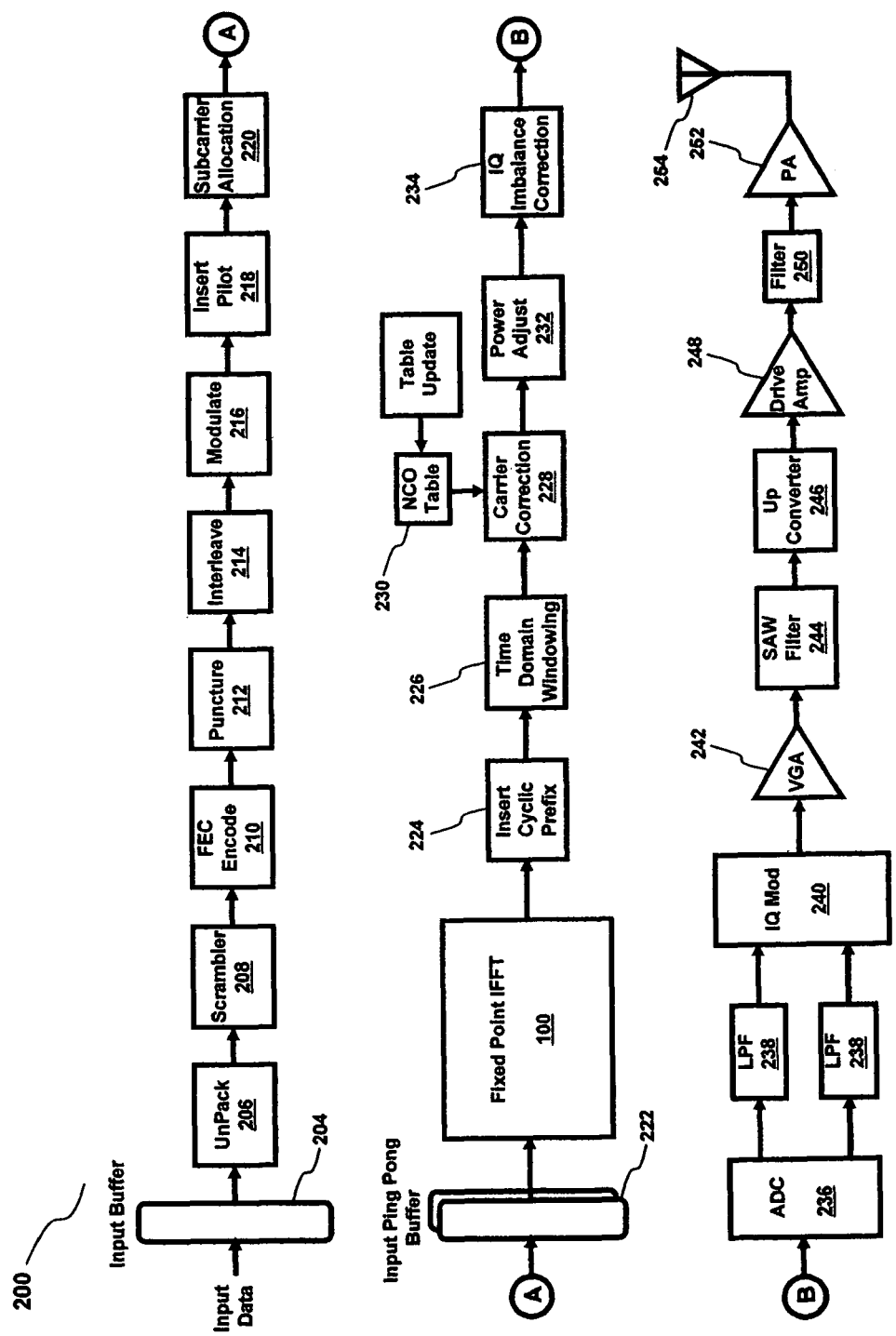
FIG. 2 illustrates an OFDMA digital modulator implemented with the fixed-point IFFT device in accordance with one embodiment of the present invention.

FIG. 2 illustrates an OFDMA digital modulator 200 in accordance with one embodiment of the present invention. The OFDMA digital modulator 200, to be integrated with the fixed-point IFFT device 100, is designed for transmitting data wirelessly using the OFDMA mode.

Before an input signal can be transmitted, the signal must go through many steps of adjustments, calculations, and conversions. One of the most critical steps is the critical calculations made by the algorithms within the fixed-point IFFT device 100 where the input data is converted by using inverse fast Fourier transform. The inverse fast Fourier transform is the inverse of a discrete Fourier transform (DFT) algorithm which reduces the number of computations needed for N number of points from $2N^2$ to $2N*\log_2(N)$. With the fixed-point IFFT device 100, the frequency division multiplexing strategy known as "parallel data transmission" is possible, thus allowing the data demodulator of the receiving end to use computer program employing one of the fast Fourier transform algorithms to recover the data after an analog to digital conversion.

Before reaching the fixed-point IFFT device 100, a signal must enter the conventional OFDMA digital modulator 200 through an input buffer 204 and go through multiple data processing steps such as a data unpacking block 206, a scrambler 208, a forward error correction (FEC) encode block 210, a puncture block 212, an interleave block 214, a modulate block 216, an insert pilot block 218, and a sub-carrier allocation module 220 before going through another input buffer 222 and entering the fixed-point IFFT device 100.

After the signal passes through the fixed-point IFFT device 100, the signal is typically adjusted by an insert cyclic prefix block 224, a time domain windowing block 226, a carrier correction block 228 that operates with a numerically-controlled oscillator that is controlled by an updated numerical data table 230, a power adjustment block 232, and an in-phase and quadrature-phase (IQ) imbalance correction block 234. The adjusted signal is then converted with an analog-to-digital converter (ADC) 236 before going through at least a pair of low-pass filters (LPF) 238. The filtered signal is then modulated by the IQ modulator 240 and the analog output signal is amplified by a voltage-gain amplifier 242 before going through a surface acoustic wave (SAW) filter 244. After the SAW filter 244, the frequency of the signal must be shifted up by an up-converter 246 so it meets the transmitting specifications. However, the analog outgoing signal is still not strong enough to be transmitted and must be amplified by a drive amplifier 248, filtered again by a filter 250, and again amplified by a power-amplifier 252 before transmitted out through an antenna 254.

This invention provides a method for improving Signal to Quantization Noise Ratio (SQNR) of an OFDMA digital modulator. By implementing additional components such as a sub-carrier activity detector and scale termination calculator to a modified fixed-point IFFT unit within an OFDMA digital modulator, the need for higher dynamic range, complex fixed-points arithmetic units, or additional dynamic scaling circuitry is no longer necessary while the level of SQNR can also be improved.

Figure 3:
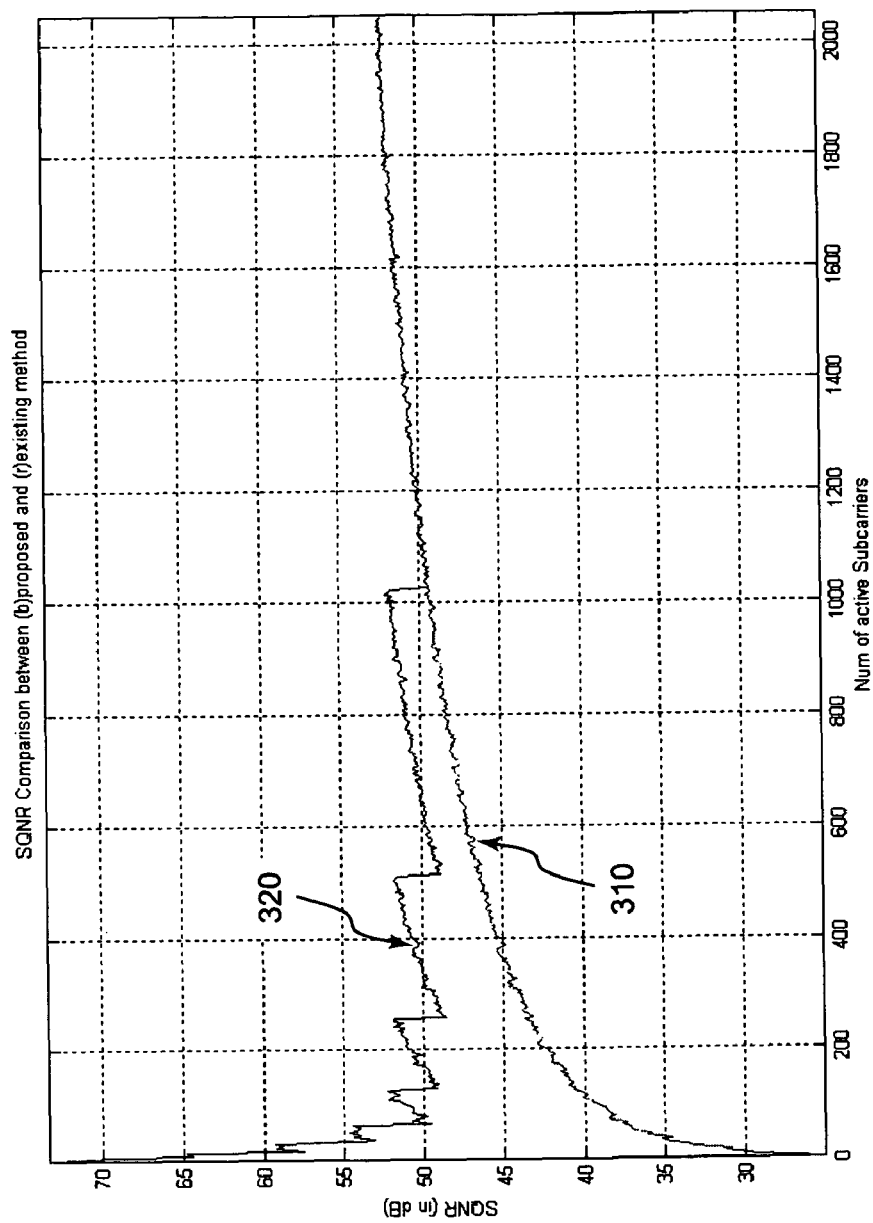
FIG. 3 illustrates a SQNR performance as a function of the number of active subcarriers.

FIG. 3 illustrates a SQNR performance as a function of the number of active subcarriers. A line 310 represents the SQNR to be expected from conventional implementation. It is observed that the SQNR degrades as a function of the number of subcarriers. Whereas, as represented by a line 320, the SQNR of the proposed system 100 shown in FIG. 1 remains high and actually improves as the number of subcarriers decreases.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system comprising:
   an inverse Fast Fourier Transform (IFFT) unit having a plurality of scaling stages and configured to receive a modulated sub-carrier symbol set as an input;
   a sub-carrier activity detector configured to receive the modulated sub-carrier symbol set and to detect a number of active sub-carriers in the symbol set;
   a scale termination calculator configured to determine at which of the plurality of scaling stages of the IFFT unit to terminate IFFT scaling based on a predetermined function of the number of active sub-carriers detected by the sub-carrier activity detector and to generate an output indicating the scaling stage at which scaling is to be terminated; and
   a scaling controller configured to generate a plurality of control signals based on the output of the scale termination calculator, wherein the plurality of control signals are configured to control the plurality of scaling stages in the IFFT unit.

2. The system of claim 1, wherein the sub-carrier activity detector is configured to evaluate each element of the symbol set.

3. The system of claim 1, wherein the predetermined function used by the scale termination calculator is a base-two logarithm of a difference between a length of the symbol set and the number of active sub-carriers.

4. The system of claim 1 further comprising a sub-carrier allocation module configured to generate the symbol set.

5. The system of claim 1, wherein the scaling controller is configured to generate a control signal for each scaling stage, and wherein each control signal is an on-or-off signal that controls a corresponding scaling stage to be enabled or bypassed.

6. The system of claim 1, wherein the scaling controller is configured to fix a scaling value at "+2" for the plurality of scaling stages.

7. A method for controlling scaling of a fix-point inverse Fast Fourier Transform (IFFT) apparatus comprising a plurality of scaling stages, the method comprising:
   receiving a modulated sub-carrier symbol set;
   detecting a number of active sub-carriers in the symbol set;
   determining at which of the plurality of scaling stages to terminate IFFT scaling based on a predetermined function of the number of active sub-carriers; and
   controlling scaling by the plurality of scaling stages based on the determining.

8. The method of claim 7, wherein the detecting further comprises looping through a length of the symbol set.

9. The method of claim 7, wherein determining the stage at which to terminate scaling comprises calculating a smallest integral value that is larger than a base-two logarithm of a difference between a length of the symbol set and the number of active sub-carriers.

10. The method of claim 7, wherein controlling comprises enabling or bypassing a number of scaling stages based on the determining.

11. The method of claim 7, wherein controlling comprises fixing a scaling value at "+2" for each of the plurality of scaling stages.

12. The system of claim 3, wherein the scale termination calculator is configured to determine at which of the plurality of scaling stages to terminate the IFFT scaling based on calculating a smallest integral value that is larger than the base-two logarithm.

13. An apparatus comprising:
   a sub-carrier activity detector configured to receive as input a plurality of modulated sub-carrier symbol sets and to detect a number of active sub-carriers in the symbol sets;
   a scale termination calculator configured to determine a stage at which to terminate inverse Fast Fourier Transform (IFFT) scaling of the symbol sets based on a predetermined function of the number of active sub-carriers detected by the sub-carrier activity detector and to generate an output indicating a scaling stage at which to terminate IFFT scaling; and
   a scaling controller configured to generate a plurality of control signals based on the output of the scale termination calculator, wherein the plurality of control signals are configured to control corresponding ones of a plurality of scaling stages.

14. The apparatus of claim 13, wherein the scaling controller is configured to generate the plurality of control signals, each of which is an on-or-off signal that controls a corresponding scaling stage to be enabled or bypassed based on the scaling stage at which scaling is to be terminated.

15. The apparatus of claim 13, wherein the scale termination calculator is configured to use a base-two logarithm of a difference between a length of the symbol sets and the number of active sub-carriers as the predetermined function.

16. The apparatus of claim 15, wherein the scale termination calculator is configured to determine at which of the plurality of scaling stages to terminate the IFFT scaling based on calculating a smallest integral value that is larger than the base-two logarithm.

* * * * *